United States Patent
Nathanson et al.

[15] 3,702,476
[45] Nov. 7, 1972

[54] DIGITAL PROGRAMMED TRANSMITTER

[72] Inventors: Fred E. Nathanson, Silver Spring; David M. White, Adelphi, both of Md.

[73] Assignee: The United States of America as represented by the Secretary of the Navy

[22] Filed: March 18, 1963

[21] Appl. No.: 266,112

[52] U.S. Cl. ......343/17.1 PF, 343/17.2 R, 343/5 DP
[51] Int. Cl. ................................................G01s 7/28
[58] Field of Search .....343/17.1, 17.2, 5 DP, 17.1 R, 343/17.1 PF, 17.2 R

[56] References Cited

UNITED STATES PATENTS 2,671,896  3/1954  De Rosa ...................343/17.1
3,076,191  1/1963  Williams.....................343/14

*Primary Examiner*—T. H. Tubessing
*Attorney*—Q. Baxter Warner and Claude Funkhouser

EXEMPLARY CLAIM

4. A radar transmitter for providing a coded pulse transmission comprising,
   a signal generator providing a plurality of pulses,
   means for producing a pseudo-random code,
   counting means connecting to said code means or providing control signals which are spaced in accordance with the code generated by said code means, and
   driving means for transmitting the output pulses from said signal generator in response to said control signals, thereby producing a transmission having a variable pulse repetition frequency.

7 Claims, 5 Drawing Figures

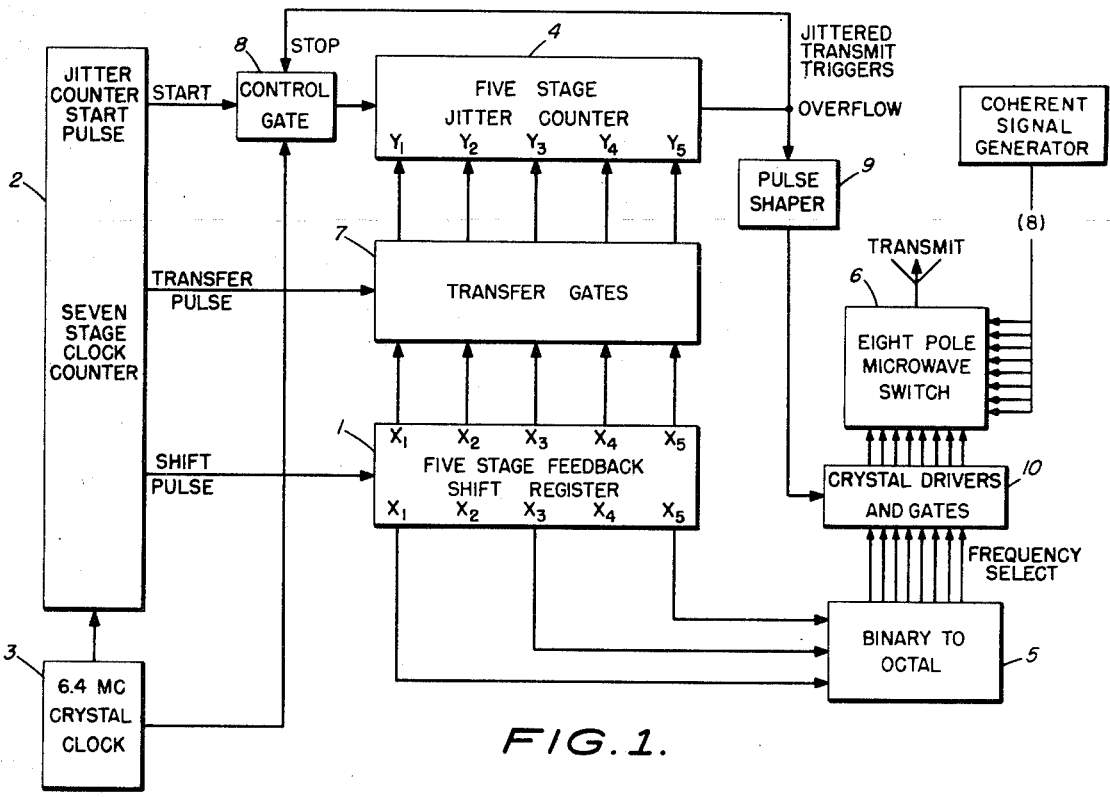
FIG.1.
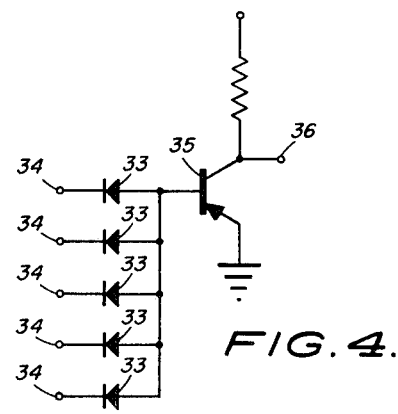
FIG.4.
FIG.3.
FRED E. NATHANSON
DAVID M. WHITE
INVENTORS
BY Claude Funkhouser
ATTORNEY

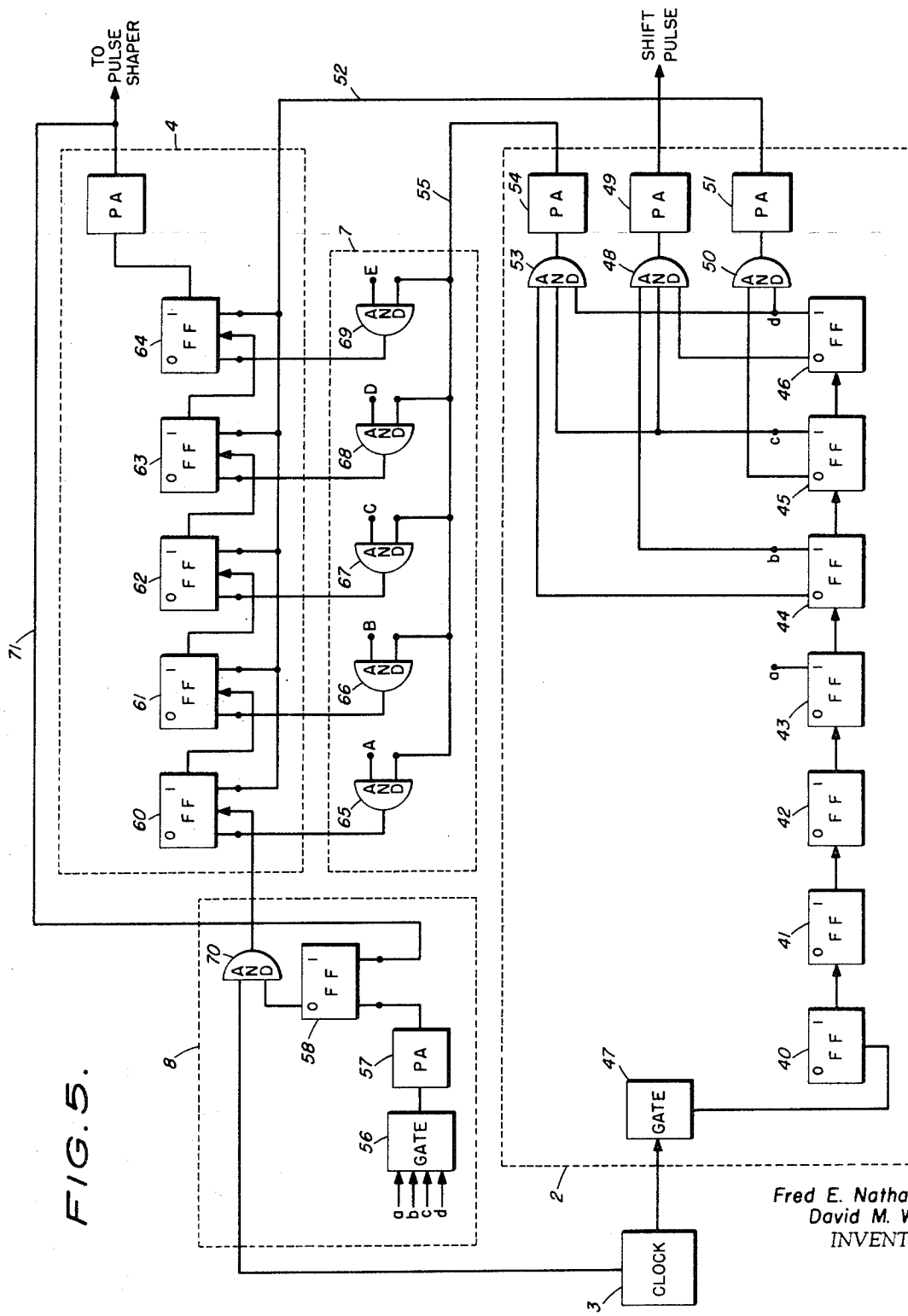

DIGITAL PROGRAMMED TRANSMITTER

The present invention relates in general to radar systems and in particular to a programmed transmitter for producing coherent pulse transmissions in which the pulse repetition rate and the frequency from pulse to pulse are varied in a pseudo-random fashion.

The present invention is designed for use in a complex weapons system of which the radar system described and illustrated in patent application Ser. No. 20,231, now U.S. Pat. No. 3,618,190, filed Apr. 5, 1960, John B. Garrison, inventor, assigned to the U.S. Government (Navy Case No. 29973), is a component part. The overall weapons system provides for simultaneous multiple target tracking and weapon guidance and utilizes a high powered spherically symmetric multiple beam radar system which provides for multiple control and extremely rapid beam shifting. Countermeasures problems are met by designing the system with such characteristics as frequency diversity, Doppler discrimination, and high power. The pulse repetition frequency may be fixed, pre-programmed or randomly jittered; the transmit and receive beams can be pointed in any direction in the hemisphere within a few microseconds; and the radiated power may be divided among search, track-while-scan, and target tracking in any proportion.

The present invention comprises a digital programmed transmitter for generating a pseudo-random code to be used for varying the pulse repetition rate and the pulse frequency from pulse to pulse in a pseudo-random manner.

It is an object of the present invention to provide a digital programmed transmitter which will add a varying delay to each of a group of uniformly spaced transmission pulses.

It is another object of the invention to provide a digital programmed transmitter which will generate a pseudo-random code for controlling the frequency of each of a train of transmitted pulses.

It is a further object of the invention to provide a digital programmed transmitter which generates a pulse transmission having variable frequency and variable repetition rate from pulse to pulse in a pseudo-random manner.

Other objects and many of the attendant advantages of this invention will be readily appreciated as the same becomes better understood by reference to the following detailed description when considered in connection with the accompanying drawings, wherein:

FIG. 1 is a schematic of one embodiment of the programmed transmitter according to the invention;

FIG. 3 is a compilation of the thirty-two states through which the register of FIG. 2 will pass, along with the frequency designations associated therewith;

FIG. 4 is a detailed diagram of one form of diode gate which may be used with the invention;

FIG. 5 is a detailed schematic diagram of the transfer gates, jitter counter and clock counter of FIG. 1.

Figure 2:
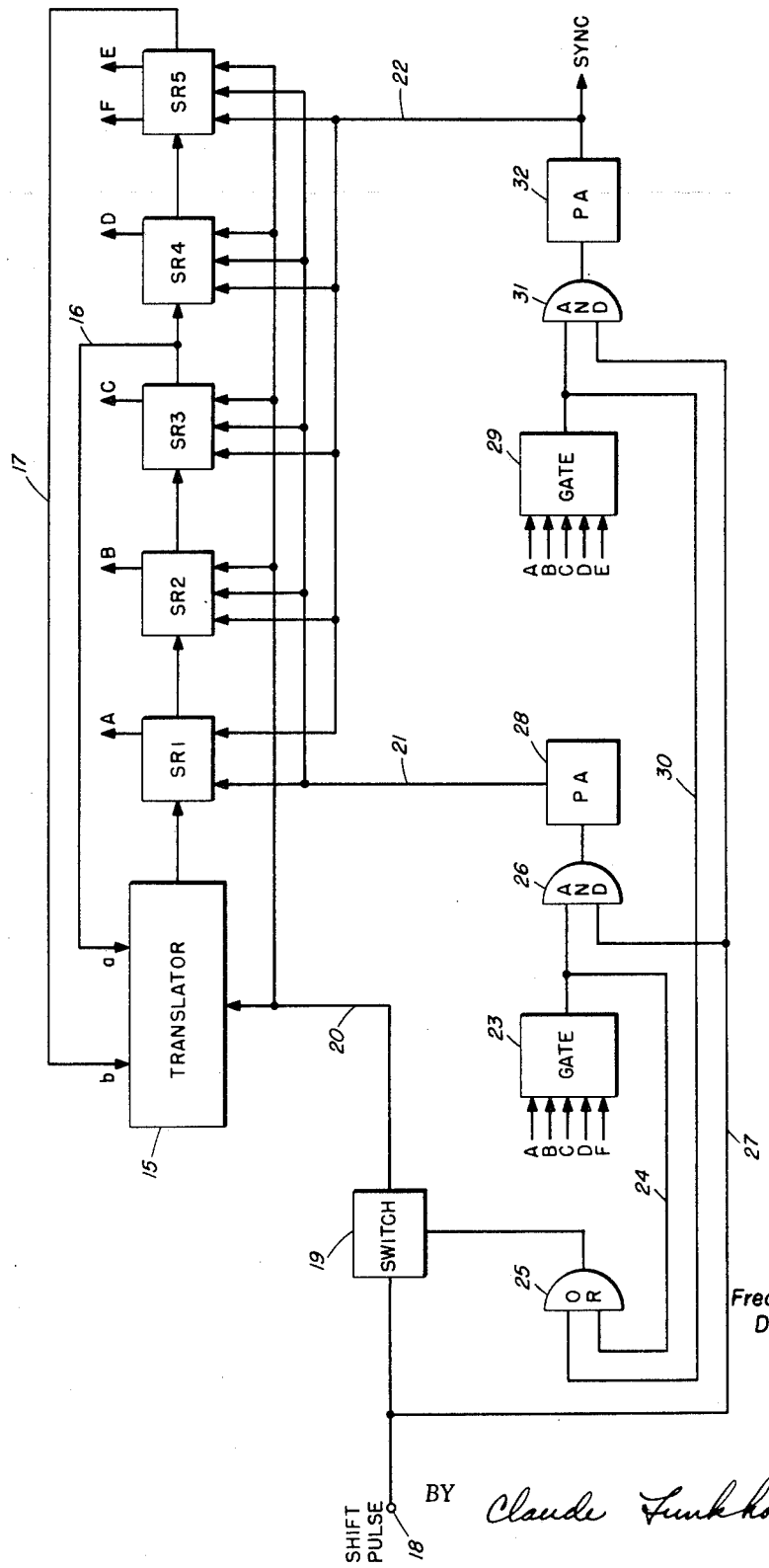
FIG. 2 is a detailed schematic diagram of the shift register shown in FIG. 1.

The programmer, shown in FIG. 1, according to the invention is a digital subsystem which specifies and synchronizes the jitter or pulse repetition frequency variation and the frequency of the transmitted pulses. The system as shown is set up to provide 32 transmitted pulses in the T microsecond dwell period. Each of these transmitted pulses is displaced from its basic $t$ microsecond spacing by adding increments of delay ranging from 0 to $d$ microseconds, where $d$ is less than $t$. The increments of delay for each transmitted pulse are specified by a 32 state pseudo-random code. This yields a pulse repetition period variation of $t \pm d$ microseconds. The transmitted frequency is diversified from pulse to pulse over eight frequencies and from the available 32 state code each of the eight frequencies will occur four times in the dwell period T in a programmed manner. The pulse repetition frequency and the frequency selection differ from pulse to pulse as determined by the 32 bit code and repeat cyclically for each dwell period.

The basic functions of the programmer shown in FIG. 1 are performed by a feedback shift resister 1 which generates the preferred code, a clock counter 2 which controls the timing in response to a crystal clock 3, a jitter counter 4 which converts the code from the shift register into a jitter which is imparted to the transmitted pulse, and a logic circuit consisting of binary-to-octal converter 5 and microwave switch 6 which specifies one of eight frequencies from the code in register 1 to be transmitted.

Looking more closely to the system of FIG. 1, clock pulses derived from crystal clock 3 are applied to and counted by a seven stage clock counter 2 from which is derived a shift pulse, a clear pulse, a transfer pulse and a start pulse. In initiating operation of the system the shift pulse from clock counter 2 is applied to register 1 thereby advancing its state. The jitter counter 4 is cleared by a pulse from clock counter 2 and the transfer pulse opens a set of transfer gates 7 allowing each of the feedback shift register flip-flop outputs to set corresponding flip-flops in the five stage jitter counter 4. The start pulse then opens a control gate 8 which allows clock pulses from crystal clock 3 to fill the jitter counter 4 in 0 to $d$ microseconds, depending upon which of the 32 binary states is set in the counter 4. When the jitter counter fills, an overflow pulse occurs which is applied on the one hand to control gate 8, thereby disconnecting the crystal clock 3 from jitter counter 4, and on the other hand through a pulse shaper 9 to a crystal driver "and" gate combination 10 which applies the coded output of binary-to-octal converter 5 to the eight pole microwave switch 6 where a single transmission frequency is selected according to the applied code. The transmission frequencies are supplied to the switch 6 from the coherent signal generator. The input to converter 5 is derived from the first, third and fifth flip-flops in shift register 1. This sequence of operation occurs once every $t$ microseconds for each transmitted pulse. Each of the 32 pulses in the T microsecond dwell time has associated with it a different jitter determined by the 32 bit code which recycles once every dwell period.

The code generator called for by the invention is a feedback shift register of the type disclosed in U.S. Pat. No. 2,951,230, issued to W. J. Cadden on Aug. 30, 1960. The register as used in the invention is illustrated in FIG. 2 and consists basically of five shift register stages SR1 through SR5 which are connected in a closed loop through a translator 15. Feedback signals via lines 16 and 17 from SR3 and SR5, respectively, to the translator 15 are compared in the translator and used to control the input to SR1. More specifically, if the states of SR3 and SR5 are similar, a binary "0" is shifted into SR1; if the states of SR3 and SR5 are dissimilar, a binary "1" is shifted into stage SR1. In this manner a pseudo-random binary code may be generated which will traverse through 31 possible states (excluding 00000).

The state of the register shown in FIG. 2 is changed with the application of each shift pulse, which enters at terminal 18 and is applied to the register via switch 19 and line 20. These shift pulses are derived from clock counter 2 which, as previously explained, controls and times the application of pulses from crystal clock 3 to each of the components of the system.

Each of the shift register stages SR1 through SR5 contain two isolated inputs to each side and a single output from each side. The register may be set to 00000 by direct application of a pulse to each stage via line 21. In order to then initiate operation of the cycle, the register may be set to 10000 by application of a pulse to each stage via line 22.

FIG. 3 shows a compilation of the 32 states through which the register will pass in each cycle. It can be seen that each of the binary stages from one through 32 appears in the output of the register during one complete cycle; however, the binary states do not appear in order, but appear in a pseudo-random manner.

As shown in FIG. 3 the initial state of the register is 10000 which is set in a manner to be explained below. With the application of each shift pulse, the register changes state until the thirty-first state 00001 appears. At this point, the state of the register is detected by a diode gate 23 which has five inputs connected to the five outputs A, B, C, D and F of the shift register stages SR1 through SR5, respectively. When the state 00001 is detected, a signal is applied by diode gate 23 on the one hand via line 24 and through "or" gate 25 to switch 19, thereby opening line 20 and preventing further application of shift pulses to the register stages. The output of diode gate 23 is applied on the other hand to an "and" gate 26 which will pass this signal upon application thereto of the next shift pulse via line 27. This signal from gate 26 is amplified in pulse amplifier 28 and applied to line 21 thereby setting the register to state 00000, which is the thirty-second state of the cycle.

When the register reaches the thirty-second state of the cycle 00000, this condition is detected by a diode gate 29 which has five inputs connected to the five outputs A, B, C, D and E of the shift register stages SR1 through SR5, respectively. When the state 00000 is detected, a signal is applied by diode gate 29 on the one hand via line 30 and through "or" gate 25 to switch 19 thereby holding the line 20 open and preventing application of shift pulses to the register stages. The output of diode gate 29 is applied on the other hand to an "and" gate 31 which will pass this signal upon application thereto of the next shift pulse via line 27. The signal from gate 31 is amplified in pulse amplifier 32 and applied to line 22 thereby setting the register to its initial state 10000. At this point no signals will appear on lines 24 and 30, and therefore switch 19 will be deactivated permitting shift pulses to enter the register once again.

The diode gates 23 and 29 are identical and may take the form of the gate illustrated in FIG. 4. The poling of the diodes 33 are such that feedback from one input 34 to another is eliminated and the output of transistor 35 will equal the lowest potential applied to any one of the inputs. Thus a high level output pulse will be produced at output terminal 36 only when all of the inputs 34 contain a high level pulse.

As explained in connection with FIG. 1, the coded output of the shift register 1 is not transmitted directly but is used to pseudo-randomly space the fixed width transmit pulses. This operation is accomplished by the five stage jitter counter 4 which is illustrated in detail in FIG. 5 along with the associated clock counter 2, control gate 8 and transfer gate 7. The clock counter 2 is a seven state straight binary counter which consists of flip-flops 40 through 46 having their outputs connected to the inputs of the following stage in the well-known manner. The counter is fed by inserting clock pulses from crystal clock 3 through a gate 47 into the first flip-flop 40. The counter then recycles through all of its states in the normal manner.

As stated above the function of clock counter 2 is to generate in a predetermined sequence a plurality of function pulses which are used to control the operation of the remainder of the system. These function pulses are derived by detecting certain states of the counter 2 which conform to the time at which a particular function pulse is needed. The first function pulse, which is the shift pulse for the shift register 1, and is derived from "and" gate 48 which detects the forty-eighth state of the counter from flip-flops 44, 45 and 46. The output of "and" gate 48 is amplified by pulse amplifier 49 and applied to input terminal 18 of shift register 1, thereby shifting the state of the shift register.

The second function pulse derived from counter 2 is the clear pulse which is used to reset or clear to zero the flip-flops in the jitter counter 4. The clear pulse is derived from "and" gate 50 which detects the states of flip-flops 45 and 46 and provides a pulse to amplifier 51 when the counter reaches its sixty-fourth state. This pulse is applied to jitter counter 4 via line 52.

The third function pulse derived from counter 2 is the transfer pulse which energizes the transfer gates 7 and allows the state of the shift register 1 to be applied to the jitter counter 4. The transfer pulse is derived from "and" gate 53 which detects the states of flip-flops 44, 45 and 46 and provides a pulse to amplifier 54 when the counter reaches its ninety-sixth state. This pulse is applied to the transfer gate 7 via line 55.

The final function pulse derived from the counter 2 is the start pulse which activates control gate 8 allowing clock pulses to be applied directly to jitter counter 4. This start pulse may also be considered a marker for the unjittered time sequence since it has a period equal to $t$ and is the base to which is added each particular delay $d$ designated by jitter counter 4. This start pulse is derived by diode gate 56 in control gate 8 which detects the outputs $a$, $b$, $c$ and $d$ flip-flops 43 through 46, respectively, and provides a control pulse through amplifier 57 to flip-flop 58 in control gate 8 when the counter reaches its one hundred twentieth state.

The jitter counter 4 is a five stage straight binary counter containing five flip-flops 60 through 64. As mentioned above, the jitter counter 4 is set according to the state of shift register 1. This is accomplished by transfer gate 7 which consists of a plurality of "and" gates 65 through 69. One terminal of each of these "and" gates receives one of the outputs A, B, C, D or E from shift register stages SR1 through SR5, respectively, and these outputs are applied to flip-flops 60 through 64 in jitter counter 4 upon application of the transfer pulse from line 55 to the other "and" gate terminals. However, according to the invention, the state of shift register 1 is to be applied to jitter counter 4 in reverse. For this reason the outputs A, B, C, D and E are applied to the left hand stage of each of the flip-flops 60 through 64.

The control gate 8 contains an "and" gate 70 to which is applied clock pulses from crystal clock 3. When the start pulse from clock counter 2 activates flip-flop 58, a control pulse is applied to "and" gate 70 allowing the clock pulses to pass through the gate to flip-flop 60 in jitter counter 4. The jitter counter starts at its pre-set state and continues to fill with clock pulses until an overflow pulse appears in the output of flip-flop 64. This will take anywhere from 0 to $d$ microseconds depending upon the pre-set state of the counter.

The overflow pulse in the output of flip-flop 64 is applied on the one hand via line 71 back to flip-flop 58 in control gate 8 thereby de-activating the control gate and blocking further application of clock pulses to jitter counter 4. The overflow pulse is applied on the other hand to pulse shaper 9 and crystal driver "and" gate combination 10 (shown in FIG. 1) where frequency selection and transmission is initiated.

It can thus be seen that the time between generation of the "start" pulse and appearance of the "over-flow" pulse depends upon the particular binary state which is fed into the jitter counter 4 from the shift register 1. Since this time delay is added to each pulse repetition interval in the transmission, the pulse repetition frequency of the transmission will vary according to the binary code generated by the shift register 1. Since this binary code is pseudo-random in nature, the pulse repetition frequency of the transmission will also vary in a pseudo-random manner.

The variation of the transmit frequency from pulse to pulse is also determined by the feedback shift register code. From FIG. 1 it is seen that the A, C and E outputs from the shift register 1 are applied to a binary-to-octal converter 5. The converter 5 produces a pulse at one of its eight outputs in response to the three bit binary representation appearing at its input. This output pulse is in turn applied to crystal driver "and" gate combination 10 which transfers this pulse to microwave switch 6 when pulsed by the output of pulse shaper 9. The control signal applied to the microwave switch 6 from combination 10 connects one of the eight coherent frequencies applied to the microwave switch to the transmit antenna. With each state of the shift register 1 one of the eight frequencies will be transmitted and the timing of these transmissions will be controlled by jitter counter 4. The sequence of frequencies transmitted is shown in FIG. 3. It is noted that each of the eight frequencies are selected in the pseudo-random fashion of the code generated by shift register 1 and each of the frequencies repeats itself four times during a complete sequence.

The resultant output from the system of FIG. 1 is a train of pulses having a pseudo-random pulse repetition frequency and having a variable frequency from pulse to pulse. For this reason in radars operating according to the invention range and Doppler ambiguities are held to a minimum, and Doppler blind spots which occur at multiples of the pulse repetition rate are substantially eliminated.

Obviously, many modifications and variations of the present invention are possible in the light of the above teachings. It is therefore to be understood that within the scope of the appended claims the invention may be practiced otherwise than as specifically described.

What is claimed is:

1. A radar transmitter for providing a coded pulse transmission comprising,
   a coherent signal generator providing a plurality of pulses each at a different frequency,
   a feedback shift register for providing a pseudo-random code, and
   means for periodically transmitting one pulse from said generator at a frequency selected by the output of said feedback shift register such that the frequency of said transmitted signals varies from pulse to pulse in a pseudo-random manner.

2. A radar transmitter for providing a coded pulse transmission comprising,
   an antenna for radiating microwave energy,
   a pulse generator connected to said antenna for supplying energy pulses thereto in response to a control signal,
   a crystal clock for providing uniformly spaced timing signals,
   a feedback shift register for providing a pseudo-random code,
   a variable time delay counter,
   means for transferring the state of said shift register into said counter in response to said clock signals,
   first control means for applying said timing signals to said counter after it has been set by said transfer means, and
   second control means for detecting an overflow state in said counter and for providing a control pulse in response thereto, said control pulse being applied to said pulse generator for control thereof.

3. A radar transmitter for providing a coded pulse transmission comprising,
   an antenna for radiating microwave energy,
   a signal generator providing a plurality of coherent pulses at different frequencies,
   switch means connected to said generator and said antenna for selecting and applying one of said pulses to said antenna in response to a control signal,
   a feedback shift register for providing a pseudo-random code,
   means for selecting the frequency of the pulse to be transmitted in response to the state of said shift register,
   a variable time delay counter,
   means for transferring the state of said shift register into said counter,
   a crystal clock for providing uniformly spaced timing signals,
   first control means for applying said timing signals to said counter after it has been set by said transfer means, and second control means for detecting an overflow state in said counter and for providing a control pulse in response thereto, said control pulse being applied to said coherent generator for control thereof.

4. A radar transmitter for providing a coded pulse transmission comprising, a signal generator providing a plurality of pulses, means for producing a pseudo-random code, counting means connected to said code means or providing control signals which are spaced in accordance with the code generated by said code means, and driving means for transmitting the output pulses from said signal generator in response to said control signals, thereby producing a transmission having a variable pulse repetition frequency.

5. A radar transmitter for producing a coded pulse transmission as defined in claim 4 wherein, said signal generator is a coherent signal generator providing a plurality of pulses at different coherent frequencies, and said driving means also selects the frequency of the pulses to be transmitted in response to said code generating means thereby producing a transmission in which the pulses vary in frequency from pulse to pulse.

6. A radar transmitter for providing a coded pulse transmission comprising, a feedback shift register providing a pseudo-random code, pulse generating means for producing a plurality of uniformly spaced pulses, counting means connected to said pulse generating means for producing timing signals, a variable time delay counter, means for applying the state of said shift register to said counter in response to said counting means, means for applying pulses from said pulse generating means to said counter after it is set by said shift register until an overflow pulse appears in the output of said counter, a signal generator providing a plurality of pulses at different frequencies, and means for transmitting a different frequency from said generator in response to each overflow pulse from said counter thereby providing a pulsed transmission having a variable pulse repetition rate.

7. A radar transmitter for providing a coded pulse transmission comprising, a feedback shift register providing a pseudo-random code, a crystal clock for producing a plurality of uniformly spaced pulses, a first binary counter connected to said crystal clock for counting said pulses and producing timing signals in response thereto, a second binary counter connected to said shift register, a plurality of transfer gates connected between said shift register and said second counter for applying the state of said shift register to said second counter in response to a timing signal from said first counter, a control gate connected to said clock and said second counter for applying clock pulses to said second counter in response to a timing signal from said first counter after said second counter has been set and until an overflow pulse is produced, a coherent signal generator providing a plurality of pulses at different coherent frequencies, and means for transmitting a different pulse from said generator in response to each overflow pulse from said second counter thereby providing a pulsed transmission having a variable pulse repetition rate.

* * * * *